United States Patent
Klingenburg et al.

(10) Patent No.: US 7,204,869 B2
(45) Date of Patent: Apr. 17, 2007

(54) SORPTION ROTOR

(75) Inventors: Hans Klingenburg, Essen (DE); Jing Cao, Erlangen (DE); Heino Sieber, Erlangen (DE); Peter Greil, Weisendorf (DE); Thomas Westerdorf, Bochum (DE)

(73) Assignee: Klingenburg GmbH, Gladbeck (DE)

( * ) Notice: Subject to any disclaimer, the term of this patent is extended or adjusted under 35 U.S.C. 154(b) by 227 days.

(21) Appl. No.: 10/496,634

(22) PCT Filed: Nov. 21, 2002

(86) PCT No.: PCT/EP02/13050

§ 371 (c)(1),
(2), (4) Date: Jun. 30, 2004

(87) PCT Pub. No.: WO03/043719

PCT Pub. Date: May 30, 2003

(65) Prior Publication Data

US 2005/0173998 A1    Aug. 11, 2005

(30) Foreign Application Priority Data

Nov. 23, 2001   (DE)   ................................ 101 57 550

(51) Int. Cl.
*B01D 53/06*   (2006.01)
*B01D 53/28*   (2006.01)

(52) U.S. Cl. .......................... 96/125; 96/153; 428/116; 264/630

(58) Field of Classification Search .................. 96/125, 96/153, 154; 95/113, 117–126; 55/523, 55/524, DIG. 5; 165/8; 428/116; 264/630
See application file for complete search history.

(56) References Cited

U.S. PATENT DOCUMENTS

| | | | |
|---|---|---|---|
| 3,899,555 A * | 8/1975 | Takao et al. | 156/89.22 |
| 4,012,206 A * | 3/1977 | Macriss et al. | 95/113 |
| 4,134,743 A * | 1/1979 | Macriss et al. | 95/113 |
| 5,685,897 A * | 11/1997 | Belding et al. | 96/154 |

FOREIGN PATENT DOCUMENTS

| | | |
|---|---|---|
| DE | 29 38 159 C2 | 5/1983 |
| DE | 30 21 677 C2 | 12/1984 |
| DE | 26 14 601 C2 | 7/1987 |
| DE | 43 13 976 A1 | 11/1993 |
| EP | 0492879 A1 * | 7/1992 |

* cited by examiner

*Primary Examiner*—Frank M. Lawrence
(74) *Attorney, Agent, or Firm*—Andrew Wilford

(57) ABSTRACT

A sorption rotor has end faces and is rotatably journaled to travel during a revolution through an inflow sector and an outflow sector. The rotor is made of a matrix material having a honeycomb structure with axially throughgoing flow passages. The matrix material is constituted of cellulose paper modified by a ceramic material infiltrated by a sol-gel system or a gel-forming low-viscosity liquid into the matrix.

9 Claims, 2 Drawing Sheets

SORPTION ROTOR

CROSS REFERENCE TO RELATED APPLICATIONS

This application is the US national phase of PCT application PCT/EP02/13050, filed 21 Nov. 2002, published 30 May 2003 as WO 03/043719, and claiming the priority of German patent application 10157550.5 itself filed 23 Nov. 2001.

FIELD OF THE INVENTION

The invention relates to a sorption rotor which is rotatably journalled and whose end faces have an inflow sector and an outflow sector through which the sorption rotor passes upon a rotation thereof and which has a matrix material composed of a honeycomb structure with flow passages which are axially through-going with respect to the sorption rotor.

BACKGROUND OF THE INVENTION

Such sorption rotors can, apart from drying through cooling and condensation, be used for air dehumidification. They are so configured that they remove moisture from the air traversing them. In a separate sector through which the sorption rotor passes during its rotary movement, the moisture stored therein is driven off with the supply of heat, whereupon the sorption rotor is regenerated for a new moisture removal.

Since the sorption rotor has a honeycomb structure, the not insignificant temperature fluctuations and moisture fluctuations can damage matrix materials forming the honeycomb structure and which form the storage mass. Such sorption rotors can thus only be used in comparatively narrow temperature ranges and moisture ranges. These predetermined temperatures ranges and moisture ranges for controlled operations can be maintained in practice only with considerable difficulty. An operation of such sorption rotors in tropical areas is not possible.

Furthermore, the matrix material of the sorption rotor operates with a lithium chloride solution whereby the surfaces are made hygroscopic and with which an antibacterial effect can be produced. When such a sorption rotor operates outside the optimal operating conditions, an effect is triggered whereby the lithium chloride in solid or liquid form is leached from the matrix material. This effect creates a strongly corrosive behavior on structures of the apparatus which are contacted by the lithium chloride.

The regeneration temperature of the aforedescribed sorption rotors is limited to a maximum of 70° C. so that such sorption rotors cannot be used in industrial dehumidification or can only be used in a surprisingly small number of industrial dehumidification systems.

OBJECT OF THE INVENTION

It is the object of the invention to provide a sorption rotor of the type described at the outset which, by comparison with the state of the art has a significantly increased thermal stability and strength, is characterized by good thermal shock resistance and a high shape stability and which also can be fabricated by a comparatively more economical and inexpensive process.

SUMMARY OF THE INVENTION

These objects are achieved in accordance with the invention in that the matrix material of the sorption rotor is composed of cellulose paper and is modified by means of ceramic material. The cellulose paper constituting the matrix material of the sorption rotor can be modified with ceramic precursors according to the invention that are stable up to a temperature of at least 150° C. and show no shape changes with long term use under constant temperature fluctuations and moisture fluctuations. Furthermore, the cellulose paper forming the workpiece material has a highly porous hygroscopic surface with a defined pore structure. Consequently, the sorption rotor can be fabricated at reduced cost with a high efficiency and a stable structure.

When the conditions of use involve a maximum use temperature up to 150° C., the matrix material constituted of cellulose paper of the sorption rotor can be made by a so-called sol-gel process with the requisite characteristics.

Thus, the matrix material of the sorption rotor comprised of cellulose paper can be infiltrated with a sol-gel system or a gel-forming low viscosity liquid which, for example, contains $SiO_2$, $Al_2O_3$ and/or $TiO_2$.

The use of $SiO_2$ in the sol-gel system gives rise to a high specific surface area of the cellulose paper forming the matrix material; the use of $Al_2O_3$ in the sol-gel system has the consequence of importing a high mechanical strength to the matrix material. Through the use of $TiO_2$ in the sol-gel system, there is a modification of the $SiO_2$ and the $Al_2O_3$ systems and in addition, a desired antibacterial effect.

An especially advantageous embodiment of the sorption rotor according to the invention is attainable when the matrix material constituted from a cellulose paper is infiltrated with a gel-forming low viscosity forming liquid or a gel system which apart from the ceramic material contains adsorptively effective solids, preferably zeolites.

After the immersion of the matrix material in the sol-gel system or after infiltration with this sol-gel system which can be effected at room temperature and which is selected for each predetermined use purpose, the matrix material is dried at a temperature between 100° C. and 200° C.

The pH value and the temperature for the infiltration and for the drying process are preferably so selected or adjusted that a high water vapor absorption is enabled by the defined pore structure which is produced in the matrix material.

The cellulose fibers forming the cellulose paper are stable up to a maximum of 180° C. and from a temperature of 120° C. show strong coloration. This basic strength of the cellulose paper is further stabilized by the ceramic modification of the ceramic phase as has already been indicated. Since, however, the cellulose paper forming the starting material retains its original shape, it may not be suitable for all desirable temperature ranges and moisture ranges for use as sorption rotors manufactured and configured as previously described.

A significant broadening of the fields of application of the rotor heat exchanger or the sorption rotors associated therewith according to the invention is achieved when the matrix material forming the honeycomb structure of the sorption rotor is sintered into a self-supporting composite ceramic. This sintering can be carried out at temperatures above 800° C., preferably at about 850° C. in air. In this manner with comparatively low cost and economically, a configuration of the matrix material of the sorption rotor can be produced which is effective for temperature ranges significantly above 150° C. and whereby hitherto unattainable moisture ranges can be covered as well. Such a sorption rotor is suitable even for industrial purposes over wide ranges.

When the humidity characteristics of the self supporting composite ceramic is still not sufficient for certain fields of use and requirement profiles, it is possible through a further sintering process to convert the carbon component in the matrix material with silicon to an SiC ceramic. This sintering process is carried out with an inert gas treatment at temperatures above 800° C. With the transformation of the workpiece material according to the present invention, a completely ceramic character can be obtained which produces the finest pores in the surface of the matrix material. In case these pores do not enable sufficient moisture absorption for certain applications, it is advantageous to reinfiltrate the sintered matrix anew with a sol-gel system and then to effect a fresh drying.

To produce an antibacterial effect, the embodiments according to the invention that have been described can coat the matrix material of a sorption rotor according to the invention with inhibited lithium chloride.

Alternatively it is possible, to insure killing of microorganisms to add biocidally effective solid substances which can bind to the gel forming low viscosity liquid or the sol-gel system which is infiltrated into the cellulose paper forming the matrix material. It has been found to be especially advantageous in this connection to use the solid substances Amina T100 and Limago T100 which are substances bearing the registered trademarks of CREAVIS Gesellschaft für Technologie and Innovation mbH.

The aforedescribed sorption rotor according to the invention can be fabricated at low technological cost and hence economically by the methods of the instant invention.

BRIEF DESCRIPTION OF THE DRAWING

In the following the invention is described in greater detail in connection with an embodiment and with reference to the drawing. It shows.

SPECIFIC DESCRIPTION

Figure 1:
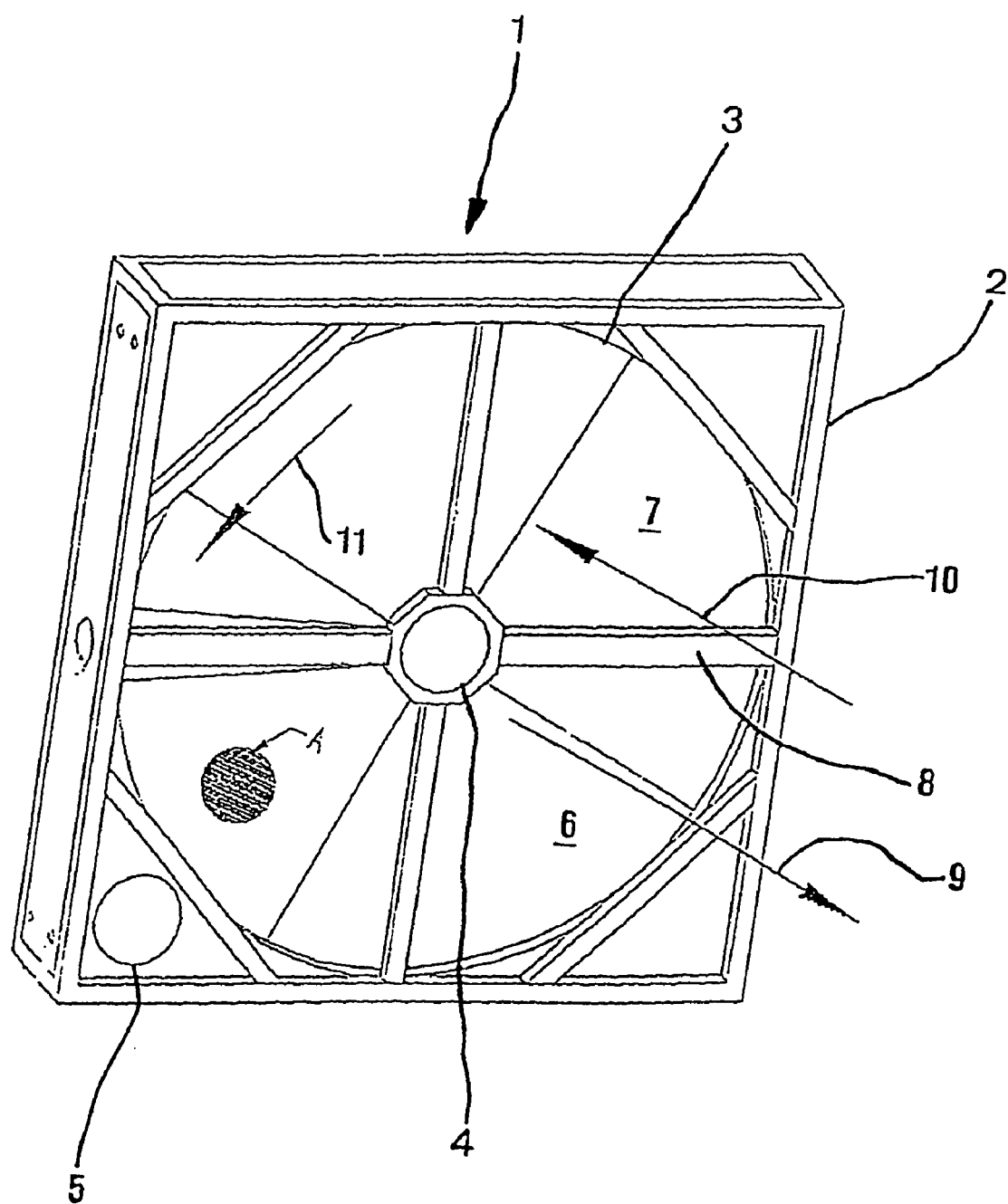
FIG. 1 a view of a sorption rotor according to the invention.

An air dehumidifying device 1 shown in FIG. 1 in a perspective view has a generally square frame 2 in the illustrated embodiment.

Within the generally square frame 2, a sorption rotor 3 is rotatably arranged on a hub 4. A motor 5 serves as the drive for rotating movement of the sorption rotor 3. In an end or flow cross sectional area of the sorption rotor 3, the latter passes into an inflow sector 6 and an outflow sector 7. In the illustrated embodiment, the inflow sector 6 is configured to lie below the horizontal beam 8 which connects the two opposite sides of the frame 2 with one another. The outflow sector 7 is located above the horizontal beam 8.

The inflow sector 6 of the air dehumidifying device is traversed by a process flow or inflow of air 9. The process temperature or inflowing air temperature is thereby increased. Moisture is stored in the sorption rotor 3 by depositing itself upon the surface thereof. When the sorption rotor 3 traverses the outflow sector 7, the stored moisture is driven off by the heated regeneration air stream, whereby the sorption rotor 3 is regenerated.

Figure 2:
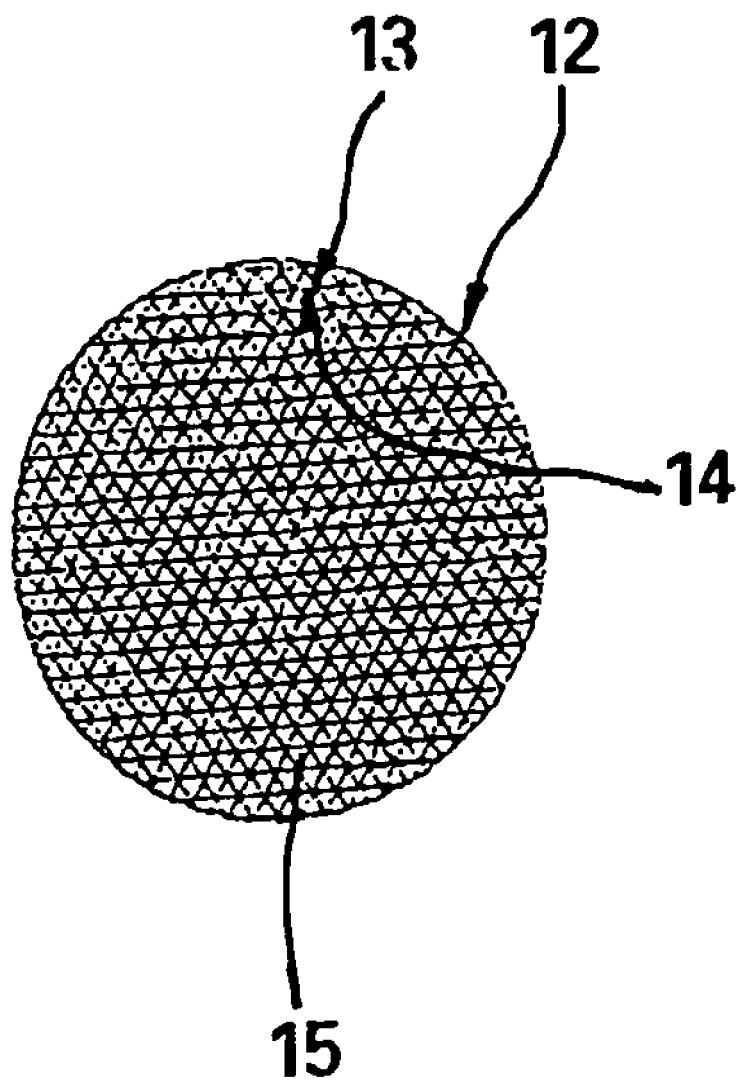
FIG. 2 a detail A from FIG. 1.

The sorption rotor 3 is comprised of a matrix material of cellulose paper whose basic construction is illustrated in FIG. 2 which is a detail A from FIG. 1 of the sorption rotor 3 and from which by contrast with the illustration in FIG. 1, a precise detailed construction of the sorption rotor 3 can be seen. The matrix material 12 is comprised of smooth cylindrical and buckled, corrugated or folded cellulosic paper foils 13 or 14, whereby each buckled, corrugated or folded cellulose paper foil 13 is configured with two planar or smooth cylindrical cellulosic paper foils 14 defining flow passages 15 which traverse the sorption rotor 3 or the matrix material 12 thereof in the flow direction.

The surfaces of the cellulose paper foils 13, 14 have a capillary structure which is better capable of transferring the air humidity. Furthermore, the flow passages 15 formed by the surfaces of the cellulose paper foils 13, 14 are treated with a lithium chloride solution which, for example, contains 3 to 13 weight % lithium chloride in ethanol. Inhibited lithium chloride is used as the lithium chloride and the inhibiting agent can have a basis in a chromatic substance or a small proportion of lithium nitrate can also be used for inhibition.

Prior to treatment with the lithium chloride solution, the matrix material 12 comprised of the cellulose paper is modified by means of ceramic materials. They are immersed in or infiltrated with a sol-gel system which contains $SiO_2$ and/or $Al_2O_3$ and/or $TiO_2$ and/or mullite. The infiltration of the workpiece matrix 12 fabricated from cellulose paper with the sol-gel system is effected at room temperature. After the infiltration, the matrix material impregnated with the sol-gel system is dried at a temperature between 100° C. and 200° C.

Furthermore, the sol-gel system or the gel-forming low viscosity liquid can contain adsorptively effective solids in the form of zeolites when used for the infiltration of the matrix material of the sorption rotor; to achieve a microbacterial effect, it is possible instead of or in addition to the use of lithium chloride to add to a sol-gel system or a gel-forming low viscosity system liquid which already has the previously described components a biocidally effective solid capable of binding firmly and which may be, for example, Amina T100 and/or Limago T100, the last mentioned designations being registered marks of CREAVIS Gesellschaft für Technologie and Innovation mbH.

The pH value and the temperature of the infiltration as well as the drying stage are so selected and adjusted that the surface of the matrix material comprised of the cellulose paper has a defined pore structure which enables a high degree of adsorption of water vapor.

In another embodiment of the sorption rotor 3 according to the invention the matrix 12 is sintered to a composite ceramic. With this sintering an increase in the temperature resistance and moisture resistance of the structure of the workpiece material 12 of the sorption rotor 3 can be achieved.

The sintering process is carried out at temperatures above 800° C., for example, a temperature of 850° C. in air.

When the thus achieved strength characteristics of the matrix material 12 of the sorption rotor 3 are not sufficient for certain applications, it is possible to carry out the sintering process in two stages whereby the second stage of the sintering process is carried out at temperatures above 800° C. in inert gas whereby the carbon content of the matrix material is reacted with silicon to from SiC ceramic. By means of the one sintering process or the two sintering processes, the matrix material 12 of the sorption rotor 3 is transformed into a full ceramic whereby, in the course of this conversion, extremely fine pores are produced in the surfaces of the structure 12. For the usual applications, the fine pores that are thus generated have sufficient water vapor adsorption. If, in certain cases, this is not satisfactory, the Matrix material 12 is subjected to infiltration anew with the previously described sol-gel system and is subjected to drying.

The invention claimed is:

1. A sorption rotor having end faces and rotatably journaled to travel during a revolution through an inflow sector and an outflow sector, the rotor being comprised of a matrix material having a honeycomb structure with axially through-going flow passages, the matrix material constituted of cellulose paper modified by a ceramic material infiltrated by a sol-gel system and sintered to a self-supporting composite ceramic.

2. The sorption rotor according to claim 1 wherein the self-supporting composite ceramic formed by sintering the matrix material has its carbon component reacted with silicon to an SiC ceramic.

3. The sorption rotor according to claim 1 wherein the matrix material is sintered to a self-supporting ceramic and the carbon component is optionally reacted with silicon to an SiC ceramic in which a sol-gel system is reinfiltrated into the composite ceramic and then again dried.

4. A sorption rotor having end faces and rotatably journaled to travel during a revolution through an inflow sector and an outflow sector, the rotor being comprised of a matrix material having a honeycomb structure with axially through-going flow passages, the matrix material constituted of cellulose paper modified by a ceramic material from a sol-gel system or a gel-forming low-viscosity liquid infiltrated into the matrix material that is coated with inhibited lithium chloride.

5. A method of making a sorption rotor, the method comprising the step of:
    making a matrix material of the sorption rotor from cellulose paper modified with ceramic material from a sol-gel system or a gel-forming low-viscosity liquid infiltrated into the matrix material; and
    sintering the matrix material infiltrated with the sol-gel system to a self-supporting composite ceramic.

6. The method according to claim 5 wherein the matrix material infiltrated with the sol-gel system is sintered in air at a temperature above 800° C., for example, 850° C.

7. The method according to claim 5 wherein the sintered matrix material is sintered at a temperature above 800° C. in an inert gas so that the carbon component contained in the matrix material is reacted with silicon to an SiC ceramic.

8. The method according to claim 5 wherein the sintered matrix material is reinfiltrated with a sol-gel system and dried again.

9. A sorption rotor having end faces and rotatably journaled to travel during a revolution through an inflow sector and an outflow sector, the rotor being comprised of a matrix material having a honeycomb structure with axially through-going flow passages, the matrix material constituted of cellulose paper modified by a ceramic material infiltrated by a $TiO_2$-containing sol-gel system.

* * * * *